US012298152B2

(12) United States Patent
Raussi et al.

(10) Patent No.: US 12,298,152 B2
(45) Date of Patent: May 13, 2025

(54) MAGNETIC SENSING FOR TRUE WIRELESS STEREO HEADSET CONTROL KNOB

(71) Applicant: Huawei Technologies Co., Ltd., Shenzhen (CN)

(72) Inventors: Tommi Raussi, Helsinki (FI); Jyri Pakarinen, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 225 days.

(21) Appl. No.: 17/880,445

(22) Filed: Aug. 3, 2022

(65) Prior Publication Data

US 2022/0373358 A1 Nov. 24, 2022

Related U.S. Application Data

(63) Continuation of application No. PCT/EP2020/052600, filed on Feb. 3, 2020.

(51) Int. Cl.

*G01D 5/14* (2006.01)
*H04R 1/10* (2006.01)
*H04W 4/80* (2018.01)

(52) U.S. Cl.

CPC ............ *G01D 5/14* (2013.01); *H04R 1/1041* (2013.01); *H04W 4/80* (2018.02)

(58) Field of Classification Search

CPC .......... G01D 5/14; H04R 1/1041; H04W 4/80
See application file for complete search history.

(56) References Cited

U.S. PATENT DOCUMENTS 9,143,853 B2 9/2015 Sorensen

FOREIGN PATENT DOCUMENTS

| | | | | |
|---|---|---|---|---|
| CN | 102322878 A | | 1/2012 | |
| CN | 203522994 U | | 4/2014 | |
| JP | 2001201311 A | | 7/2001 | |
| JP | 2006033150 A | | 2/2006 | |
| JP | 2009156589 A | | 7/2009 | |
| JP | 2015217473 A | | 12/2015 | |
| JP | 2018174356 A | | 11/2018 | |
| WO | WO-2006129290 A1 | * | 12/2006 | .............. H04M 1/05 |
| WO | WO-2008145127 A1 | * | 12/2008 | ........... H04R 1/1041 |

* cited by examiner

*Primary Examiner* — Andrew Sniezek

(74) *Attorney, Agent, or Firm* — Leydig, Voit & Mayer, Ltd.

(57) ABSTRACT

An earphone device and system are provided for improving user control in true wireless stereo (TWS) headsets using a rotatable dial attached to a housing and a magnetic sensing arrangement comprising at least one magnetized portion arranged in the dial and at least one magnetic sensor arranged in the housing so that, in response to rotation of the dial, the magnetized portion intermittently engages with the magnetic sensor to indicate rotational extent and direction of the dial.

10 Claims, 3 Drawing Sheets

1
8
3
3B
3A
7
15
5
4
9
12
10

MAGNETIC SENSING FOR TRUE WIRELESS STEREO HEADSET CONTROL KNOB

CROSS-REFERENCE TO RELATED APPLICATIONS

This application is a continuation of International Application No. PCT/EP2020/052600, filed on Feb. 3, 2020, the disclosure of which is hereby incorporated by reference in its entirety.

TECHNICAL FIELD

The disclosure relates in general to the technical field of personal listening audio devices, such as earphones, headphones and headsets, and in particular to control knobs for true wireless stereo (TWS) headsets.

BACKGROUND

With increased popularity of portable media players and mobile phones in recent years, the use of headphones has become commonplace. In the following disclosure, the term "headphones" will be used to refer to over-the-ear headphones as well as in-ear headphones or earbuds.

Headsets are a type of headphone comprising one or multiple microphones and can thus provide the equivalent functionality of a telephone handset with hands-free operation. Headsets are made with either a single-earpiece (mono) or a double-earpiece (mono to both ears or stereo). Among the many applications for headsets, besides personal use for audio consumption and communication, are aviation, theatre or television studio intercom systems, and console or PC gaming. These applications all need some form of user control for adjusting e.g. volume level, audio mixing proportions, or active noise cancelling (ANC) effect.

However, in small and portable headphones such as true wireless stereo (TWS) headsets, it is challenging to create a good physical user interface due to the small physical size and the lack of visible feedback (the user cannot directly see the headset when operating it). Many existing solutions use a set of push buttons for user control, but it is difficult for the user to locate the function of each pushbutton due to the small size and close location to other buttons.

Another solution is to use a rotating volume knob as a user interface for user control, but the existing physical components for implementing this (typically a potentiometer or rotary encoder) are often prohibitively tall (in the direction of the rotation pivot) for use in TWS and other portable headsets.

SUMMARY

The present disclosure provides a device and method for improved user control in headsets which overcomes or at least reduces the problems mentioned above.

According to a first aspect, there is provided an earphone device comprising: a housing: a dial rotatably attached to the housing, the dial being disk-shaped and comprising at least one magnetized portion and at least one non-magnetized portion; and at least one magnetic sensor arranged in the housing: wherein the at least one magnetized portion is arranged to, in response to rotation of the dial, intermittently engage with the at least one magnetic sensor.

The combination of one or multiple magnetized portion(s) arranged on a dial (control knob) to intermittently engage with a magnetic sensor in the earphone housing allows for a reduced size dial with a flat physical structure that can be integrated in small sized and light TWS headsets.

An additional benefit of the combined dial-earphone with this magnetic sensing arrangement is that a large diameter dial can be used for the earphone which allows for improved user interface experience. Another additional benefit is that all the above-mentioned benefits can be obtained while not increasing or only marginally increasing the overall size of the earphone unit, thus still allowing a light and portable structure that can be fitted in or over an ear canal.

In a possible implementation form of the first aspect the earphone device comprises two magnetic sensors arranged to, in response to rotation of the dial, subsequently engage with the same at least one magnetized portion, wherein the order in which the two magnetic sensors engage with the magnetized portion indicates a rotational direction of the dial.

In a further possible implementation form of the first aspect the two magnetic sensors are configured to respectively generate a first sensor signal and a second sensor signal in response to engaging with the at least one magnetized portion: wherein a difference signal between the first sensor signal and the second sensor signal can show a positive pulse and a negative pulse; and wherein the order of the positive pulse and the negative pulse in the difference signal indicates a rotational direction of the dial.

In a further possible implementation form of the first aspect the dial comprises a pivot having a cylindrical body and extending from the central point of the dial, wherein the dial is rotatably attached to the housing through the pivot; and the at least two magnetic sensors are arranged in the housing with a substantially similar radial distance from the pivot.

In a further possible implementation form of the first aspect the dial comprises:

- a first pivot directly connected to the dial;
- a second pivot connected to the first pivot through a gear system; and
- at least one magnet arranged on a side surface of the second pivot, thereby defining the at least one magnetized portion configured to intermittently engage with the at least one magnetic sensor in response to rotation of the dial.

In a further possible implementation form of the first aspect the dial comprises at least one magnetic film strip applied to a first surface of the dial facing the housing, thereby defining the at least one magnetized portion.

In a further possible implementation form of the first aspect the dial comprises a plurality N of magnetic film strips applied to the first surface with intermittent gaps in a rotationally symmetrical arrangement, wherein the intermittent gaps define the non-magnetized portions.

In possible embodiments the number N of magnetic film strips preferably ranges between $3<N<20$, more preferably $N=16$.

In a further possible implementation form of the first aspect each magnetic film strip is arranged to cover a circular sector of the dial.

In a further possible implementation form of the first aspect the earphone device comprises a single magnetic sensor; and each of the plurality of magnetic film strips comprises a non-symmetrical shape configured to, in response to rotation of the dial, either gradually engage with the magnetic sensor or abruptly engage with the magnetic sensor, thereby indicating a rotational direction of the dial.

In a further possible implementation form of the first aspect the earphone device further comprises a speaker configured to generate acoustic waves in response to an input audio signal: wherein the dial is a volume knob arranged to adjust at least one of the overall output level of the speaker or a balance between signal components of the input audio signal. In further possible embodiments the dial may be arranged to adjust further aspects of the audio signal, such as spectral balance.

In a further possible implementation form of the first aspect at least a portion of the housing is configured to fit into an ear canal or to substantially cover the opening of an ear canal of a user of the earphone device: the housing comprising a first side, and a second side opposite to the first side: wherein the speaker is arranged in the housing facing outwards from the second side and configured to generate sound waves for delivery towards the inside of the ear canal; and wherein the dial is rotatably attached to the first side.

In a further possible implementation form of the first aspect the magnetic sensor is a magnetometer configured to measure the direction, strength, or relative change of a magnetic field at a particular location.

In a further possible implementation form of the first aspect the magnetometer is a small-scale microelectromechanical systems (MEMS) magnetic field sensor.

According to a second aspect, there is provided a system comprising:

at least one earphone device according to any one of the possible implementation forms of the first aspect; and a host device arranged in data connection with the at least one earphone device.

Combining the earphone device in data connection with a host device allows for the earphone device to be implemented without own storage and with limited processing means, resulting in a simpler construction that enables a small size and lighter weight, which are of high importance in the case of TWS headsets.

In a possible implementation form of the second aspect the earphone device is a True Wireless Stereo (TWS) headset, the host device is a mobile smartphone, and the data connection is established using a Bluetooth protocol.

These and other aspects will be apparent from and the embodiment(s) described below.

BRIEF DESCRIPTION OF THE DRAWINGS

In the following detailed portion of the present disclosure, the aspects, embodiments and implementations will be explained in more detail with reference to the example embodiments shown in the drawings, in which.

DETAILED DESCRIPTION

Figure 1:
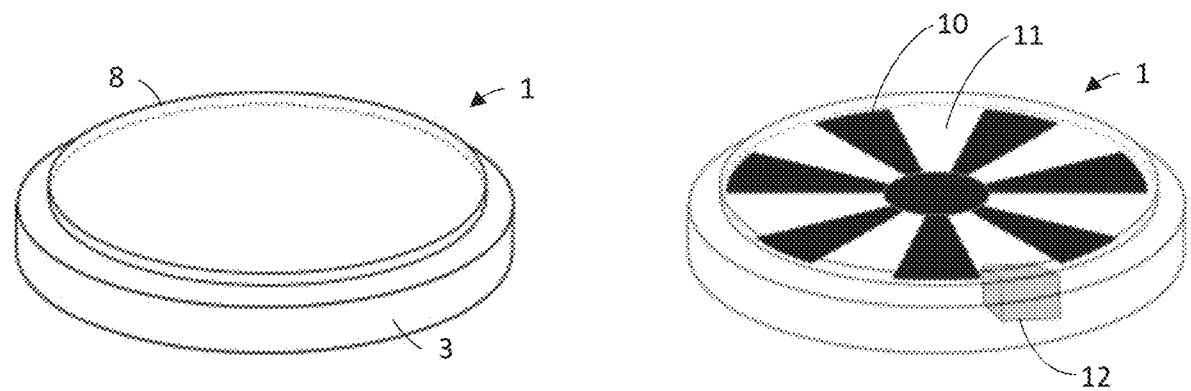
FIG. 1 shows 3D side views of the same earphone device, with a solid and a transparent dial for illustrating the magnetic sensing arrangement, in accordance with an embodiment of the first aspect.

FIG. 1 illustrates an earphone device 1 according to the present disclosure. The earphone device 1 comprises a housing 3 and a substantially flat, disk-shaped dial 8 (with a thickness substantially smaller than its diameter) rotatably attached to the housing. As shown in figure in the right, at least one magnetic sensor 12 is arranged in the housing 3, while the dial 8 comprises at least one magnetized portion 10 and at least one non-magnetized portion 11. The magnetized portion 10 is arranged in or on the dial 8 to, in response to rotation of the dial 8, intermittently engage with the at least one magnetic sensor 12, as will be explained below in more detail.

In an embodiment, the magnetic sensor 12 is a magnetometer configured to measure the direction, strength, or relative change of a magnetic field at a particular location. In an embodiment, the magnetometer is a small-scale microelectromechanical systems (MEMS) magnetic field sensor.

Figures 2A, 2B, 2C:
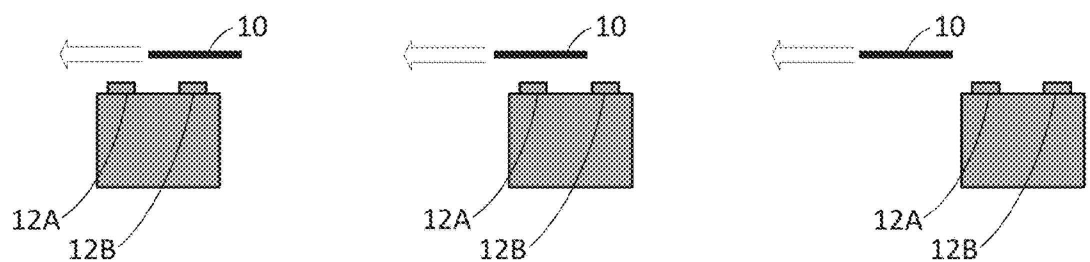
FIG. 2 is a cross-sectional view illustrating the functioning of the magnetic sensing arrangement in an earphone in accordance with another embodiment of the first aspect.

In one embodiment shown in FIG. 2, two magnetic sensors 12A, 12B are arranged in the housing 3 to subsequently engage with the same magnetized portion(s) 10 as the dial 8 is rotating in any direction. In this embodiment, the order in which the two magnetic sensors 12A, 12B engage with the magnetized portion 10 indicates a rotational direction of the dial 8, as will be explained below. Although in the figure the movement of a single magnetized portion 10 is considered for clarity, but the same principle can be used to detect the rotation of a plurality of magnetized portions 10 in a symmetrical or non-symmetrical arrangement, as will be illustrated later in FIGS. 6-7.

Figure 3:
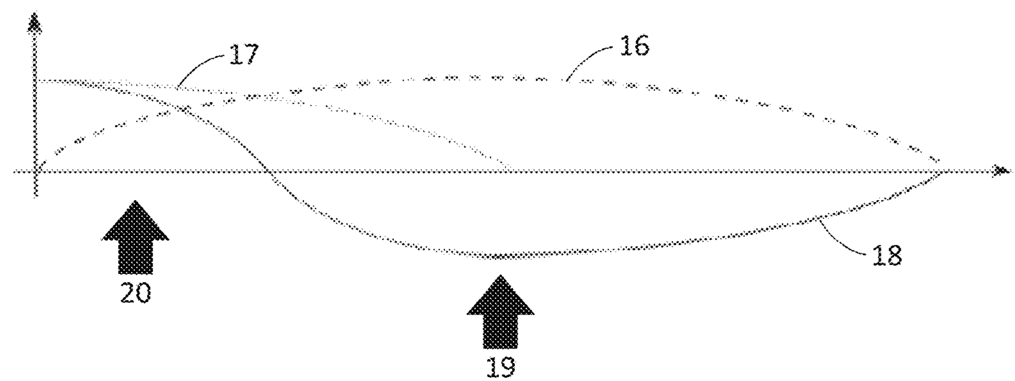
FIG. 3 shows signal readouts from the magnetic sensors illustrating the functioning of the magnetic sensing arrangement of FIG. 2.

As shown in FIG. 3, the two magnetic sensors 12A, 12B are configured to respectively generate a first sensor signal 16 and a second sensor signal 17 in response to engaging with the at least one magnetized portion 10. A difference signal 18 can then be calculated by subtracting the first sensor signal 16 from the second sensor signal 17, which can then show a positive pulse 19 or a negative pulse 20 on the timeline graph. In other words, as the magnetized portion 10 moves from right to left, the difference signal 18 experiences as positive pulse 19, followed by a negative pulse 20. If the magnetized portion 10 had moved from left to right, the difference signal 18 would have been a negative pulse 20, followed by a positive pulse 19. Thus, the direction of movement can be detected by the sensor arrangement having two magnetic sensors 12A and 12B, which can thus be detected and used for controlling a function of the earphone device 1 (such as audio volume adjustment).

Figure 4:
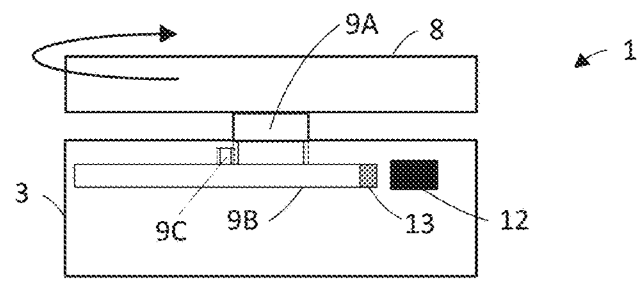
FIG. 4 shows a cross-section of an earphone device with a magnet and a magnetic sensor in accordance with another embodiment of the first aspect.
Figure 5:
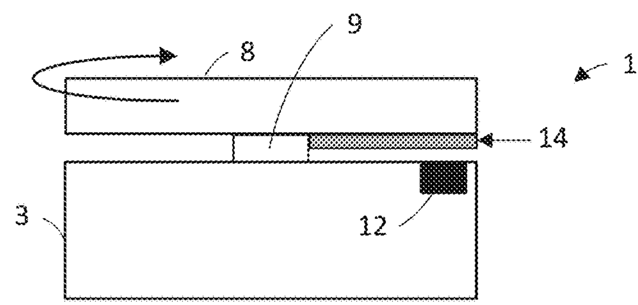
FIG. 5 shows a cross-section of an earphone device with a magnetic film strip and magnetic sensors in accordance with another embodiment of the first aspect.

In some embodiments, as also shown in FIGS. 4 and 5, the dial 8 and the housing 3 (or at least a portion of the housing 3 adjacent to the dial 8) are arranged with substantially identical, circular cross-sections, with a pivot 9 arranged to connect the dial 8 and the housing 3. In some embodiments only adjacent portions of the dial 8 and the housing 3 are arranged with circular cross-sections, the pivot 9 arranged to connect these adjacent portions at approximately their central points.

In the embodiment shown in FIG. 5, the dial 8 comprises a pivot 9 with a cylindrical body extending from its central point, the dial 8 being rotatably attached to the housing 3 through the pivot 9, and a magnetic sensor 12 (or two magnetic sensors 12A, 12B as explained above) arranged in the housing 3, with a substantially similar radial 8 distance from the pivot 9. In this embodiment the magnetic sensor(s) may function the same way as described above with respect to FIGS. 2-3, or below with respect to FIGS. 7-8, to detect movement of at least one magnetized portion 10 arranged on the dial 8.

In another embodiment shown in FIG. 4, the dial 8 comprises a first pivot 9A directly connected to the dial 8 and a second pivot 9B connected to the first pivot 9A through a gear system 9C. In this embodiment, at least one magnet 13 (or magnetic film strip 14) is arranged on a side surface of the second pivot 9B, thereby defining the at least one magnetized portion 10, configured to intermittently engage with the at least one magnetic sensor 12 in response to rotation of the dial 8. Thus, with such a gear mechanism a small rotation of the dial 8 can be transferred into a rapid rotation of the second pivot 9B, resulting in a sufficient rotation detection resolution for the dial 8.

In some embodiments the dial 8 comprises at least one magnetic film strip 14 applied to a first (lower) surface of the dial 8 facing the housing 3, thereby defining the at least one magnetized portion 10.

Figure 6:
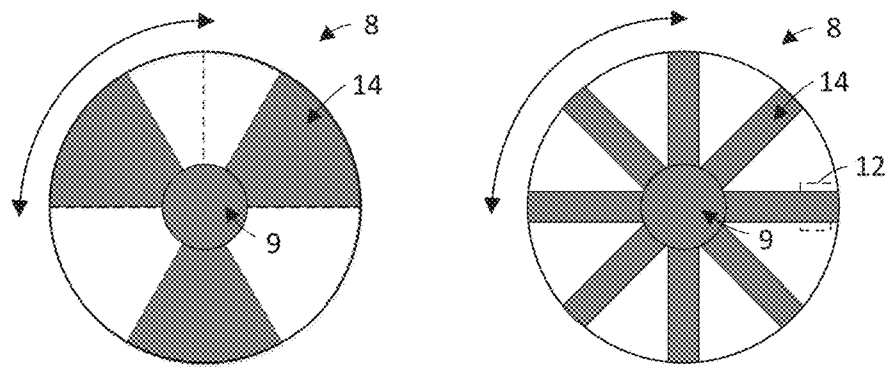
FIG. 6 shows rotationally symmetrical arrangements of magnetic film strips in accordance with another embodiment of the first aspect.

In an embodiment shown in FIG. 6, the dial 8 comprises a plurality N of magnetic film strips 14 applied to the first surface with intermittent gaps in a rotationally symmetrical arrangement, wherein the intermittent gaps define the non-magnetized portions 11. Although in the figures the number N of magnetic film strips 14 is illustrated as N=3 and N=8, in preferred embodiments the number N of magnetic film strips 14 may range between $3<N<20$, more preferably the number N of magnetic film strips 14 is N=16. In some embodiments each magnetic film strip 14 is arranged to cover a circular sector of the dial 8 (as shown in the left), whereas in other embodiments the magnetic film strips 14 cover rectangular segments.

Figure 7:
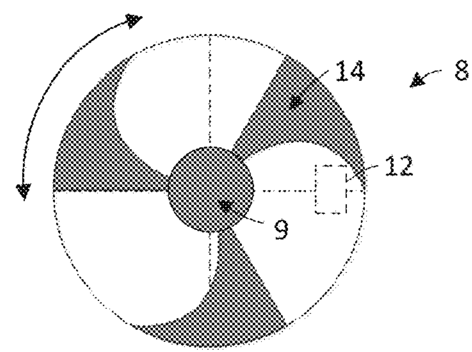
FIG. 7 shows a non-symmetrical arrangement of magnetic film strips in accordance with another embodiment of the first aspect.
Figure 8:
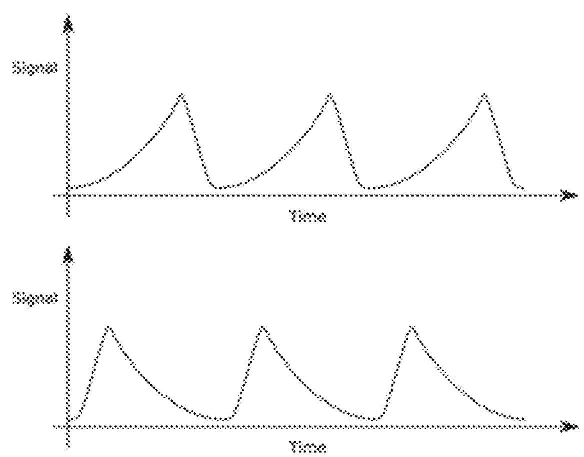
FIG. 8 shows signal readouts from the magnetic sensor illustrating the functioning of the non-symmetrical arrangement of magnetic film strips of FIG. 7.

In another embodiment shown in FIG. 7, each of the plurality of magnetic film strips 14 comprises a non-symmetrical shape configured to, in response to rotation of the dial 8, either gradually engage with a magnetic sensor 12 or abruptly engage with a magnetic sensor 12, thereby indicating a rotational direction of the dial 8. In this embodiment the earphone device 1 can comprise a single magnetic sensor 12, due to the different shape of signal readouts as illustrated in FIG. 8, showing the first (and only) sensor signal 16 both when the dial 8 of FIG. 7 is rotated clockwise (upper graph), compared to when the dial 8 is rotated counter-clockwise (lower graph). The different shape of the signal 16 allows for easy detection of rotational direction, and the single sensor 12 allows for a simple and efficient construction.

Figure 9:
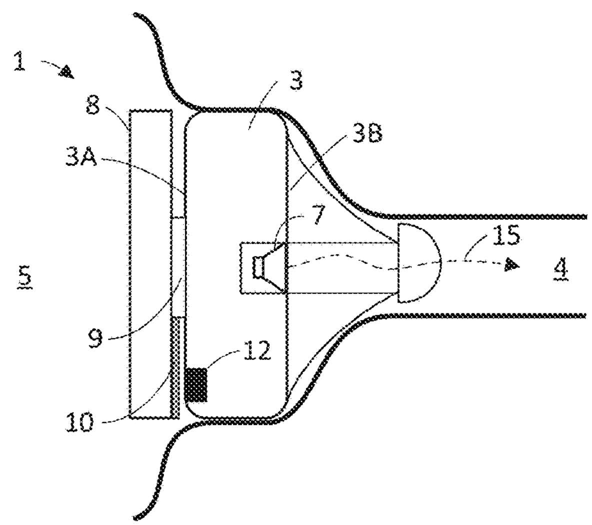
FIG. 9 shows a cross-section of an earphone device, arranged in an ear canal, in accordance with another embodiment of the first aspect.

FIG. 9) illustrates a further embodiment of the earphone device 1, wherein features that are the same or similar to corresponding features previously described or shown herein are denoted by the same reference numeral as previously used for simplicity. In this illustrated embodiment the earphone device 1 comprises a housing 3 that has at least a portion (such as an eartip) configured to fit into an ear canal 4 or to substantially cover the opening of an ear canal 4 of a user, wherein the housing 3 comprises a first side 3A, and a second side 3B opposite to the first side 3A. The dial 8 is rotatably attached to the first side 3A. A speaker 7 is also arranged in the housing 3 facing outwards from the second side 3B and configured to generate sound waves 15 for delivery towards the inside of the ear canal 4 in response to an input audio signal. The speaker 7 may comprise a front cavity and a back cavity isolated from the front cavity for optimal sound wave generation.

In an embodiment, the dial 8 is a volume knob arranged to adjust at least one of the overall output level of the speaker 7 or a balance between signal components of the input audio signal.

In possible embodiments the earphone device 1 may further comprise one or more microphone(s) 12 arranged in the housing 3 facing outwards from the first side 3A and configured to capture sound waves from the direction of the external environment 5. In an embodiment (not shown), the earphone device 1 comprises at least two microphones 12 arranged in the housing 3 facing outwards from the first side 3A and configured to be oriented towards the mouth of a user of the earphone device 1 to enable acoustic beamforming.

In a further embodiment the earphone device 1 may further comprise a voice accelerometer configured to detect presence of the voice of a user of the earphone device 1 via vibrations.

These additional inputs can generate further input signals that can be used as further components to be mixed in the input audio signal for the speaker 7, or to control other functions of the earphone device 1 (such as de-occlusion).

Figure 10:
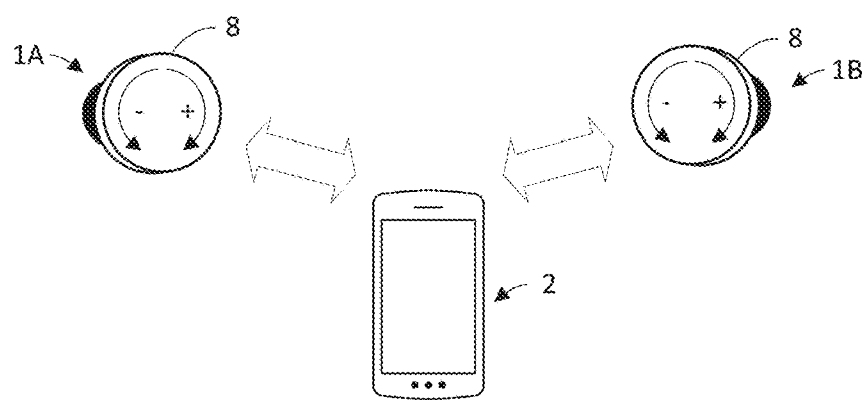
FIG. 10 shows a system with two earphone devices in data connection with a host device in accordance with an embodiment of the second aspect.

FIG. 10 shows a system according to the present disclosure comprising two earphone devices 1A and 1B in accordance with any above described embodiment, which may correspond to an implementation of a TWS earphone system configured to be used in a left and right ear of a user respectively, with no wired connection between the earphone devices 1A and 1B, and a host device 2 arranged in data connection with the at least one earphone device 1.

In this embodiment, a first earphone device 1A comprises a rotatable dial 8 as described above, and a second earphone device 1B also comprises a rotatable dial 8 as described above. Rotation of any of the dials 8 can be used to adjust the output volume of the speakers 7, or to adjust balance between signal components of the input audio signal for the speakers 7.

The host device 2 may be a mobile smartphone and the data connection may e.g. be established using a Bluetooth or Bluetooth Low Energy (BLE) protocol.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The reference signs used in the claims shall not be construed as limiting the scope.

What is claimed is:

1. An earphone device, comprising:
a housing;
a disk-shaped dial rotatably attached to the housing, the dial comprising a magnetized portion and a non-magnetized portion;
a first magnetic sensor arranged in the housing; and
a second magnetic sensor;
wherein the two magnetic sensors are configured to, in response to rotation of the dial, subsequently engage with the magnetized portion, and
wherein the two magnetic sensors are configured to respectively generate a first sensor signal and a second sensor signal in response to engaging with the magnetized portion,
wherein a difference signal between the first sensor signal and the second sensor signal is configured to show a positive pulse and a negative pulse, and
wherein an order of the positive pulse and the negative pulse in the difference signal indicates a rotational direction of said dial.

2. The earphone device according to claim 1, wherein the magnetized portion is formed from a magnetic film strip applied to a first surface of the dial facing the housing.

3. The earphone device according to claim 1, wherein the first magnetic sensor is a magnetometer configured to measure a direction, strength, or relative change of a magnetic field at a particular location.

4. The earphone device according to claim 3, wherein the magnetometer is a small-scale microelectromechanical systems (MEMS) magnetic field sensor.

5. The earphone device according to claim 1, further comprising:
a speaker configured to generate acoustic waves in response to an input audio signal,
wherein the dial is a volume knob arranged to adjust an overall output level of the speaker and/or a balance between signal components of the input audio signal.

6. An earphone device, comprising:
a housing;
a disk-shaped dial rotatably attached to the housing, the dial comprising:
a first pivot via which the dial is rotatably attached to the housing, the first pivot comprising a cylindrical body extending from a central point of the dial,
a second pivot connected to the first pivot via a gear system, and
a magnet arranged on a side surface of the second pivot, the magnet defining a magnetized portion of the dial, and
a non-magnetized portion;
a first magnetic sensor arranged in the housing; and
a second magnetic sensor,
wherein the two magnetic sensors are configured to, in response to rotation of the dial, subsequently engage with the magnetized portion,
wherein the order in which the two magnetic sensors engage with the magnetized portion indicates a rotational direction of the dial,
wherein the two magnetic sensors are arranged in the housing substantially equidistant in a radial direction from the first pivot.

7. The earphone device according to claim 6, wherein the magnetized portion is formed from a magnetic film strip applied to a first surface of the dial facing the housing.

8. The earphone device according to claim 6, wherein the first magnetic sensor is a magnetometer configured to measure a direction, strength, or relative change of a magnetic field at a particular location.

9. The earphone device according to claim 8, wherein the magnetometer is a small-scale microelectromechanical systems (MEMS) magnetic field sensor.

10. The earphone device according to claim 6, further comprising:
a speaker configured to generate acoustic waves in response to an input audio signal,
wherein the dial is a volume knob arranged to adjust an overall output level of the speaker and/or a balance between signal components of the input audio signal.

* * * * *